(12) United States Patent  
Kilmer

(10) Patent No.: US 12,129,094 B2
(45) Date of Patent: Oct. 29, 2024

(54) MULTIPLE IMMISCIBLE PHASE CHANGE MATERIALS CONTAINED IN COMMON VESSEL

(71) Applicant: AMERICAN AEROGEL CORPORATION, Rochester, NY (US)

(72) Inventor: Derek S. Kilmer, Pittsford, NY (US)

(73) Assignee: American Aerogel Corporation, Rochester, NY (US)

( * ) Notice: Subject to any disclaimer, the term of this patent is extended or adjusted under 35 U.S.C. 154(b) by 110 days.

(21) Appl. No.: 17/601,338

(22) PCT Filed: Apr. 3, 2020

(86) PCT No.: PCT/US2020/026648
§ 371 (c)(1),
(2) Date: Oct. 4, 2021

(87) PCT Pub. No.: WO2020/206306
PCT Pub. Date: Oct. 8, 2020

(65) Prior Publication Data
US 2022/0194678 A1 Jun. 23, 2022

Related U.S. Application Data

(60) Provisional application No. 62/829,675, filed on Apr. 5, 2019.

(51) Int. Cl.
*B65D 81/18* (2006.01)
*B65B 55/00* (2006.01)
(Continued)

(52) U.S. Cl.
CPC .............. *B65D 81/18* (2013.01); *B65B 55/00* (2013.01); *B65D 81/3816* (2013.01);
(Continued)

(58) Field of Classification Search
CPC .......... B21H 3/02; F25D 3/08; F25D 11/006; B65D 81/18
(Continued)

(56) References Cited

U.S. PATENT DOCUMENTS 1,369,367 A 2/1921 Elihu
2,595,328 A 5/1952 Bowen
(Continued)

FOREIGN PATENT DOCUMENTS

EP 1006058 6/2000
JP 2001330351 11/2001
(Continued)

OTHER PUBLICATIONS

De Falco, M., "Phase Change Material as Energy Material for Cold Storage and its Integration in Civil Air Conditioning Systems: material properties and on field application", in Proceedings of the Second International Conference on Mechanics, Materials and Structural Engineering (ICMMSE 2017), Apr. 2017, pp. 1-6.
(Continued)

*Primary Examiner* — Ernesto A Grano
(74) *Attorney, Agent, or Firm* — Byrne Poh LLP; Nina R. Horan

(57) ABSTRACT

This present disclosure provides a vessel assembly for use in temperature sensitive shipping that can maintain a payload temperature across a range of temperatures. The vessel assembly of the present disclosure comprises a vessel having a single chamber, in which a plurality of PCMs are in contact, but immiscible, with each other. The present disclosure reduces the overall packaging materials used in a shipper box and prevents the "wrong" mixture of PCM-containing vessels from being used.

18 Claims, 3 Drawing Sheets

(51) Int. Cl.
   *B65D 81/38* (2006.01)
   *C09K 5/06* (2006.01)
   *F25D 3/08* (2006.01)

(52) U.S. Cl.
   CPC ..... *B65D 81/3818* (2013.01); *B65D 81/3823* (2013.01); *C09K 5/066* (2013.01); *F25D 3/08* (2013.01)

(58) Field of Classification Search
   USPC .................................................. 220/592.25
   See application file for complete search history.

(56) References Cited

U.S. PATENT DOCUMENTS

| | | | |
|---|---|---|---|
| 2,814,382 A | 11/1957 | Lassiter | |
| 3,893,834 A | 7/1975 | Armstrong | |
| 4,344,300 A | 8/1982 | Taylor | |
| 4,981,135 A | 1/1991 | Hardy | |
| 5,111,957 A | 5/1992 | Hollander et al. | |
| 5,269,368 A * | 12/1993 | Schneider | B65D 81/3883 62/530 |
| 5,534,020 A | 7/1996 | Cheney et al. | |
| 5,609,039 A * | 3/1997 | Green | F25D 3/08 62/529 |
| 5,755,987 A | 5/1998 | Goldstein et al. | |
| 5,840,080 A | 11/1998 | Der Ovanesian | |
| 5,843,145 A | 12/1998 | Brink | |
| 6,083,256 A | 7/2000 | Der Ovanesian | |
| 6,484,514 B1 | 11/2002 | Joseph et al. | |
| 6,494,056 B1 | 12/2002 | Roth et al. | |
| 6,675,606 B1 | 1/2004 | Jones et al. | |
| 6,868,982 B2 | 3/2005 | Gordon | |
| 6,938,968 B2 * | 9/2005 | Tanimoto | B65D 81/3823 428/69 |
| 6,968,711 B2 * | 11/2005 | Smith | C09K 5/047 62/480 |
| 7,422,143 B2 | 9/2008 | Mayer | |
| 7,954,338 B2 | 6/2011 | Lien | |
| 8,053,047 B2 | 11/2011 | Siegel et al. | |
| 8,061,158 B2 | 11/2011 | Roth et al. | |
| 9,266,659 B2 | 2/2016 | Sarcinella | |
| 10,107,541 B2 | 10/2018 | Kuczynski et al. | |
| 10,378,810 B2 | 8/2019 | Na et al. | |
| 10,676,267 B2 * | 6/2020 | Seiders | B65D 81/3818 |
| 10,869,777 B2 | 12/2020 | Cull | |
| 11,396,415 B2 | 7/2022 | Kilmer et al. | |
| 11,572,227 B2 * | 2/2023 | Pranadi | B65D 19/06 |
| 11,591,133 B2 * | 2/2023 | Longley | F28D 20/02 |
| 11,608,221 B2 * | 3/2023 | Lee | B65D 77/06 |
| 11,634,263 B2 * | 4/2023 | Longley | F28D 15/02 165/46 |
| 11,634,266 B2 * | 4/2023 | Kulangara | B65D 81/18 220/592.2 |
| 11,634,267 B2 * | 4/2023 | Longley | B65D 81/3897 165/46 |
| 2002/0147242 A1 | 10/2002 | Salyer et al. | |
| 2003/0000517 A1 | 1/2003 | Joseph et al. | |
| 2004/0173556 A1 | 9/2004 | Smolko et al. | |
| 2004/0180176 A1 * | 9/2004 | Rusek, Jr. | B32B 5/245 428/69 |
| 2004/0231355 A1 | 11/2004 | Mayer | |
| 2006/0277938 A1 | 12/2006 | Meyer et al. | |
| 2007/0275134 A1 | 11/2007 | Siegel et al. | |
| 2008/0230203 A1 | 9/2008 | Christ et al. | |
| 2008/0230508 A1 | 9/2008 | Overgaard | |
| 2009/0039045 A1 | 2/2009 | Chen | |
| 2010/0084411 A1 | 4/2010 | Lien | |
| 2010/0326993 A1 * | 12/2010 | Mayer | B65D 81/3825 220/592.2 |
| 2011/0185764 A1 | 8/2011 | Kelly | |
| 2011/0290792 A1 | 12/2011 | Krzak et al. | |
| 2013/0174581 A1 | 7/2013 | Rasmussen et al. | |
| 2013/0213977 A1 | 8/2013 | Stathes et al. | |
| 2013/0255306 A1 | 10/2013 | Mayer | |
| 2014/0054297 A1 | 2/2014 | Patstone | |
| 2014/0151382 A1 | 6/2014 | White et al. | |
| 2014/0263368 A1 | 9/2014 | Booska | |
| 2014/0331711 A1 | 11/2014 | Blezard et al. | |
| 2015/0192340 A1 | 7/2015 | Andrews | |
| 2016/0200501 A1 | 7/2016 | Lee et al. | |
| 2017/0253409 A1 | 9/2017 | Owens et al. | |
| 2017/0314851 A1 | 11/2017 | Alexander et al. | |
| 2018/0036202 A1 | 2/2018 | Wengreen et al. | |
| 2018/0086534 A1 * | 3/2018 | Kilmer | F25D 3/08 |
| 2018/0099797 A1 | 4/2018 | Biesecker Longacre et al. | |
| 2018/0135905 A1 | 5/2018 | Kuczynski et al. | |
| 2018/0162627 A1 | 6/2018 | Bessho et al. | |
| 2018/0250116 A1 | 9/2018 | Mourhatch et al. | |
| 2018/0251250 A1 | 9/2018 | Knoerzer | |
| 2018/0328644 A1 | 11/2018 | Rizzo et al. | |
| 2019/0011147 A1 | 1/2019 | Chopard et al. | |
| 2019/0177071 A1 | 6/2019 | Coulombe et al. | |
| 2019/0210790 A1 | 7/2019 | Rizzo et al. | |
| 2019/0226744 A1 | 7/2019 | Wood et al. | |
| 2019/0242636 A1 | 8/2019 | Tsuno | |
| 2019/0331390 A1 | 10/2019 | Chen et al. | |
| 2020/0039723 A1 | 2/2020 | Knutsen et al. | |

FOREIGN PATENT DOCUMENTS

| | | |
|---|---|---|
| WO | WO 20120176708 | 12/2012 |
| WO | WO 2016035105 A1 | 3/2016 |

OTHER PUBLICATIONS

European Search Report dated Dec. 14, 2018 in EP Patent Application No. 16780789.0, pp. 1-7.
Examination Report dated Jul. 30, 2021 in EP Patent Application No. 16780789.0, pp. 1-5.
Global Plastic Sheeting, "HDPE vs LLDPE vs LDPE", Dec. 3, 2010, pp. 1-6, available at: https://www.globalplasticsheeting.com/hdpe-vs-lldpe-vs-ldpe.
International Preliminary Report on Patentability dated Oct. 26, 2017 in International Patent Application No. PCT/US2016/027638, pp. 1-7.
International Search Report and Written Opinion dated Jul. 15, 2016 in International Patent Application No. PCT/US2016/027638, pp. 1-15.
Notice of Allowance dated Apr. 5, 2022 in U.S. Appl. No. 15/566,419, pp. 2-3.
Office Action dated Jan. 29, 2021 in U.S. Appl. No. 15/566,419, pp. 1-80.
Office Action dated Feb. 5, 2020 in U.S. Appl. No. 15/566,419, pp. 1-43.
Office Action dated May 27, 2022 in CA Patent Application No. 2982788, pp. 1-6.
Office Action dated Jun. 23, 2020 in U.S. Appl. No. 15/566,419, pp. 2-20.
Office Action dated Jul. 7, 2021 in U.S. Appl. No. 15/566,419, pp. 2-24.
Office Action dated Jul. 26, 2019 in U.S. Appl. No. 15/566,419, pp. 1-32.
Office Action dated Dec. 13, 2021 in U.S. Appl. No. 15/566,419, pp. 2-4.
International Preliminary Report on Patentability dated Oct. 14, 2021 in International Patent Application No. PCT/US2020/026648, pp. 1-7.
International Search Report and Written Opinion dated Jun. 16, 2020 in International Patent Application No. PCT/US2020/026648, pp. 1-8.
Extended European Search Report dated Nov. 3, 2022 in EP Application No. 20785269.0, pp. 1-7.
Office Action dated Oct. 10, 2023 in EP Patent Application No. 16780789.0, pp. 1-7.

* cited by examiner

//  MULTIPLE IMMISCIBLE PHASE CHANGE MATERIALS CONTAINED IN COMMON VESSEL

1. BACKGROUND

In the field of temperature sensitive shipping, it is desirable to keep the temperature as constant as possible and within a specific temperature range, depending on the type of product being shipped ("payload"). Typically, this is achieved, in passive systems (i.e., those without mechanical devices), by using a phase change material ("PCM") within a shipper box. The PCM offsets the heat energy entering or leaving the shipper box, by absorbing or releasing energy as it changes temperature or as it changes phase from solid to a liquid, solid to a gas or from a liquid to a gas (or vice versa).

A single PCM can be used in situations in which it is desired to maintain a payload at temperature below or above a certain temperature. For example, a single PCM can be used at or near the desired temperature range. However, in situations in which it is desired to maintain a payload within a range of temperatures, a single PCM is not effective. This is because a single PCM is unable to affect or bracket both ends of the temperature range. Specifically, if a single PCM that changes phase at 4° C. is used to maintain a range of temperatures, such as from 2 to 8° C., then to keep the temperature from falling below 2° C., the PCM must be preconditioned at a temperature of above 4° C. to a liquid state at 6° C. However, this liquid 6° C. PCM is not effective at preventing the temperature from rising above 8° C. If, on the other hand, a different PCM, which changes phase at 6° C. is frozen to 4° C., is used, the frozen PCM is effective in preventing the payload from rising in temperature above 8° C., but not effective in preventing the payload from falling in temperature below 2° C.

Thus, in situations in which it is desired to maintain a payload temperature across a range of temperatures, more than one PCM can be used. In practice, a single PCM is placed within a vessel (e.g., a bag, bottle, container and the like). Another PCM is placed within a second vessel. A mixture of the two vessels are then arranged within a shipper box to achieve the desired temperature range. However, this arrangement often leads to an excess of packaging materials that do not contribute to the desired temperature control because each vessel, when packed, increases the amount of packaging materials within the shipper box, and importantly, adds empty spaces within the shipper box. Moreover, shipper boxes are commonly assembled by personnel who are not experienced with PCMs. What can happen is that, without specific instructions, the wrong mixture of PCM containing vessels may be used, thereby compromising the product being shipped.

Alternatively, the two different PCMs can be placed in a single multi-chamber vessel assembly in which the two PCMs are physically separated from each other, but the overall bottle is a single part. US Patent Application Publication No. 2018/0086534 discloses such a dual-PCM single bottle design. In practice, the single multi-chamber bottle design has benefits. For example, the single bottle design makes the insulated box packing process easier and less error-prone since all the bottles are identical and the arrangement cannot be done incorrectly.

Citation of any reference in Section 1 of this application is not to be construed as an admission that such reference is prior art to the present application.

2. SUMMARY OF THE DISCLOSURE

This present disclosure provides a vessel assembly for use in temperature sensitive shipping that can maintain a payload temperature across a range of temperatures. The vessel assembly of the present disclosure comprises a vessel having a single chamber, in which a plurality of PCMs are in contact, but immiscible, with each other. The two immiscible PCMs, while placed in the same vessel assembly, function as two independent PCMs. Importantly, this vessel assembly reduces the overall packaging materials used in a shipper box, reduces manufacturing and material costs, is easily manufactured and used, reduces filling challenges that can occur in multi-chamber vessel assemblies, and prevents the "wrong" mixture of PCM-containing vessels from being used.

In one aspect, the present disclosure provides a vessel assembly comprising a vessel having a chamber and optionally a filling port. The chamber comprises a first PCM that operates at an upper limit in a range of temperatures and a second phase change material that operates at a lower limit in the range of temperatures. The second phase change material is in contact with but immiscible with the first phase change material.

In a second aspect, the present disclosure provides a method of preparing a vessel assembly for maintaining a payload temperature across a range of temperatures. The method comprises filling a chamber of a vessel with a first PCM that operates at an upper limit in a range of temperatures; and filling the chamber with a second PCM that operates at a lower limit in the range of temperatures. The second phase change material is in contact with, but immiscible, with the first phase change material.

In a third aspect, the present disclosure provides a method of transporting a payload to a desired location using any of the vessel assemblies described herein.

In a fourth aspect, the present disclosure provides a method of insulating a payload using any of the vessel assemblies described herein.

In a fifth aspect, the present disclosure provides a method of maintaining payload temperature across a range of temperatures using any of the vessel assemblies described herein.

3. BRIEF DESCRIPTION OF THE FIGURES

4. DETAILED DESCRIPTION

Figure 1:
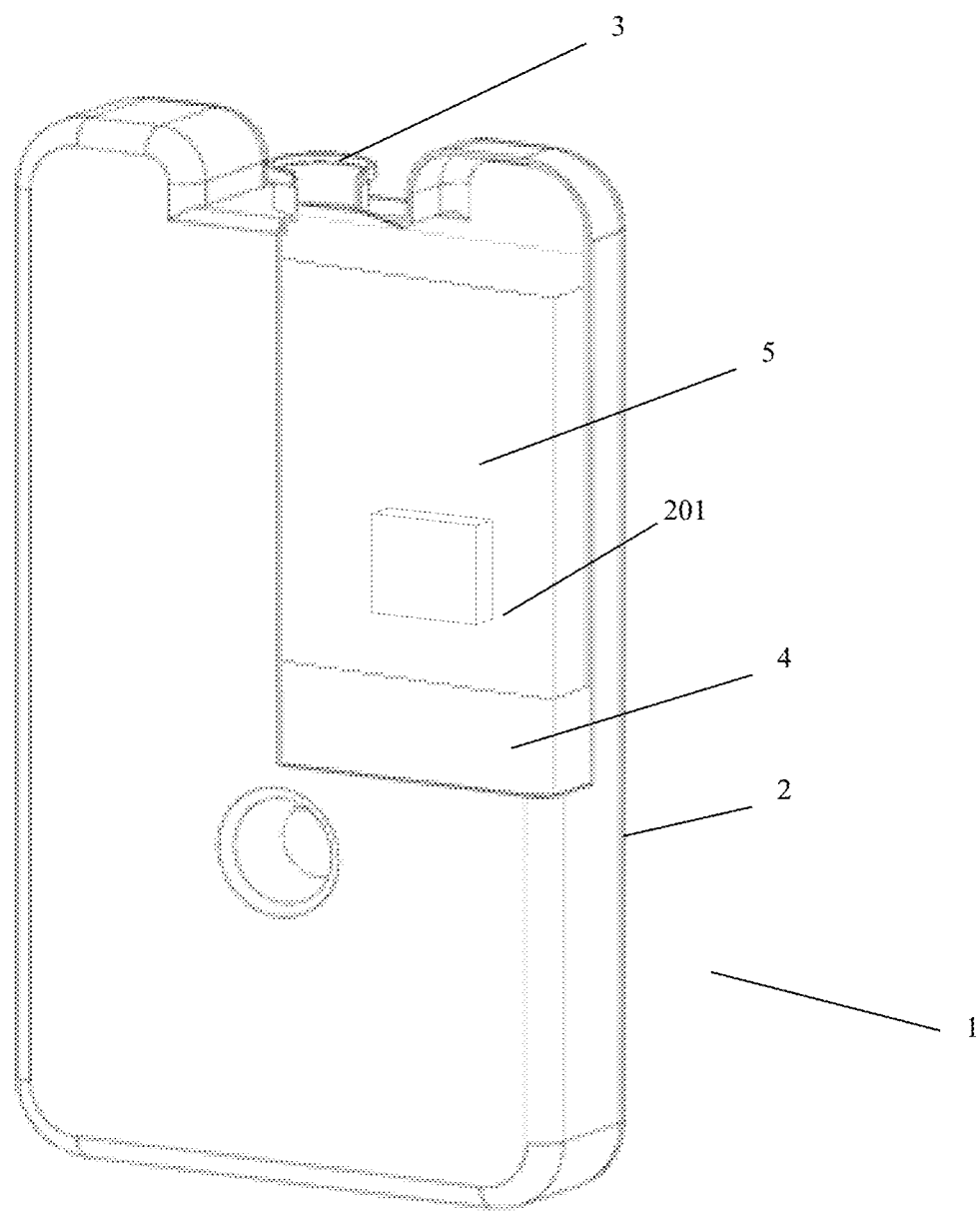
FIG. 1 shows a vessel assembly according to one embodiment of the disclosure.
Figure 2:
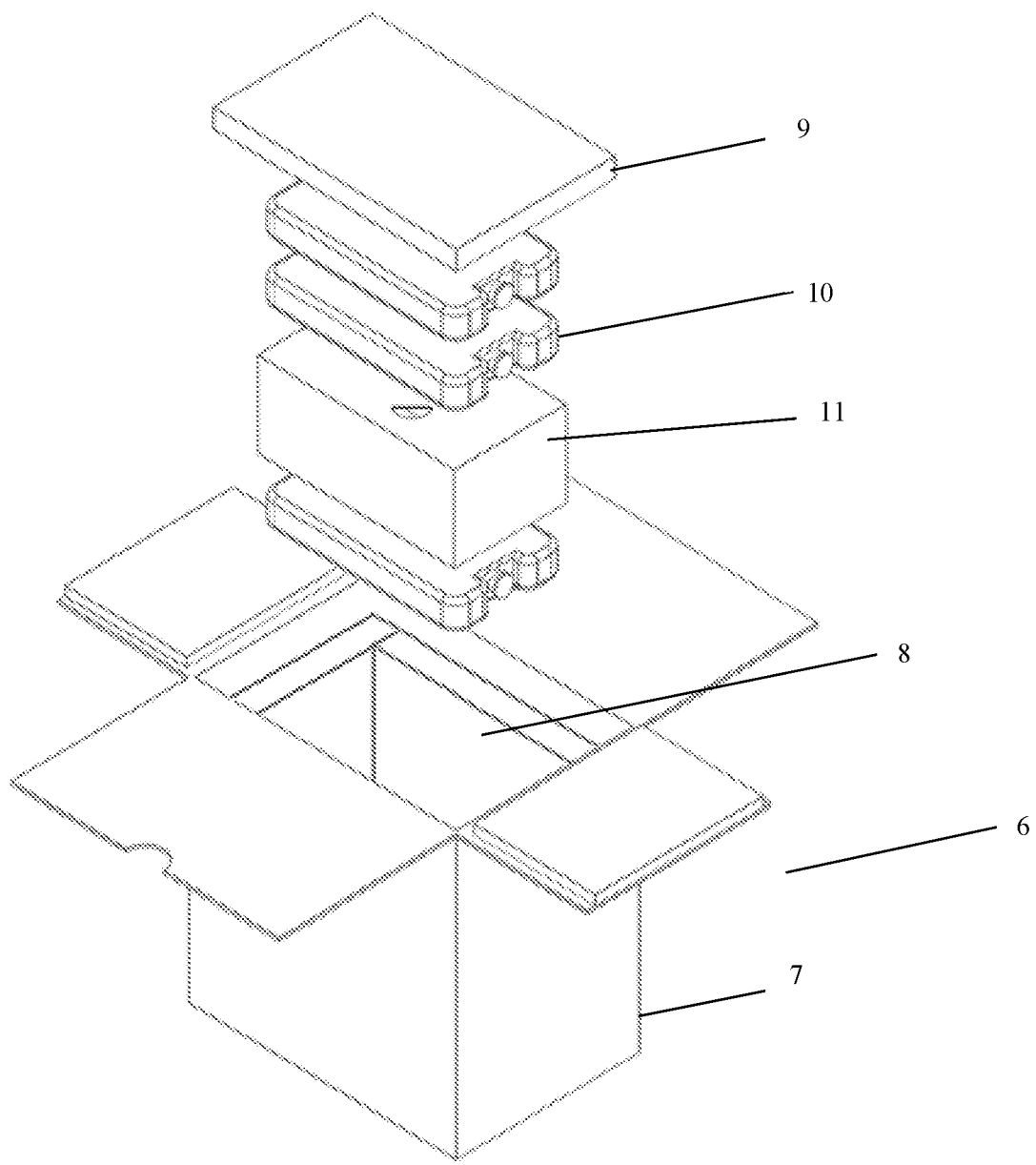
FIG. 2 shows an insulated shipping box comprising a vessel assembly of the disclosure.

The Invention includes the Following:
(1) A vessel assembly comprising a vessel having a chamber and optionally a filling port, the chamber comprising a first phase change material that operates at an upper limit in a range of temperatures and a second phase change material that operates at a lower limit in the range of temperatures, the second phase change material being in contact with, but immiscible with, the first phase change material.

(2) The vessel assembly of the above (1), wherein vessel comprises a material selected from Nylon-LLDPE laminated plastic film, fluorine-treated blow-molded HDPE, polyethylene, polypropylene, EVOH, nylon, fluorinated PE, fluorinated PP, PTFE, a fluorinated polymer, coextruded PE/Nylon, PP/Nylon, PE/EVOH and PP/EVOH.

(3) The vessel assembly of the above (1) to (2), wherein the first phase change material is a hydrated salt(s).

(4) The vessel assembly of the above (3), wherein the hydrated salt is selected from the group consisting of sodium chloride, calcium chloride, sodium sulfate, ammonium nitrate, potassium carbonate, ammonium chloride, and potassium chloride.

(5) The vessel assembly of the above (4), wherein first phase change material is calcium chloride.

(6) The vessel assembly of any of the above (1) to (5), wherein the second phase change material is an alkane.

(7) The vessel assembly of the above (6), wherein the second phase change material is hexadecane.

(8) The vessel assembly of any of the above (1) to (7), further comprising a temperature indicator.

(9) The vessel assembly of any of the above (1) to (8), further comprising electronics.

(10) A method of preparing a vessel assembly for maintaining a payload temperature across a range of temperatures, the method comprising
a. filling a chamber of a vessel with a first PCM that operates at an upper limit in a range of temperatures; and
b. filling the chamber with a second PCM that operates at a lower limit in the range of temperatures, the second phase change material being in contact with, but immiscible with, the first phase change material.

(11) An insulated shipping box, comprising the vessel assembly of any of the above (1) to (9).

(12) The insulated shipping box of the above (11), further comprising at least one vacuum insulation panel.

(13) The insulated shipping box of the above (12), wherein the vacuum insulation panel comprises a core material selected from the group consisting of polystyrene, polyurethane, fiberglass, silica and organic foam.

(14) The insulated shipping box of any of the above (11) to (13), further comprising a payload.

(15) A method of transporting a payload to a desired location, the method comprising
a. placing a vessel assembly according to any one of the above (1) to (9) and preconditioned to a specific temperature within a shipper box;
b. placing a payload within the shipper box; and
c. transporting the shipper box comprising the payload to the desired location.

(16) A method of insulating a payload, the method comprising
a. providing a vessel assembly according to any one of the above (1) to (9) and preconditioned to a specific temperature within a shipper box; and
b. placing a payload within the shipper box.

(17) A method of maintaining a payload temperature within a range, the method comprising
a. providing a vessel assembly according to any one of the above (1) to (9) and, preconditioned to a specific temperature, within a shipper box; and
b. placing a payload within the shipper box;

wherein the vessel assembly maintains the payload temperature within the range.

4.1 Definitions

Unless defined otherwise, all technical and scientific terms used herein have the same meaning as those commonly understood by one of ordinary skill in the art to which this invention belongs. Although methods and materials similar or equivalent to those described herein can be used in the practice or testing of the present invention, suitable methods and materials are described below. The materials, methods and examples are illustrative only, and are not intended to be limiting. All references, publications, patents, patent applications and other documents mentioned herein are incorporated by reference in their entirety. Unless clearly indicated otherwise, the following terms as used herein have the meanings indicated below.

Throughout this specification, the word "comprise" or variations such as "comprises" or "comprising" will be understood to imply the inclusion of a stated integer or groups of integers but not the exclusion of any other integer or group of integers.

The term "a" or "an" may mean more than one of an item.

The terms "and" and "or" may refer to either the conjunctive or disjunctive and mean "and/or".

The term "about" means within plus or minus 10% of a stated value. For example, "about 100" would refer to any number between 90 and 110.

The term "phase change material" refers to a substance that absorbs and releases thermal energy while changing from one phase to another, e.g., melting and freezing. Since PCMs undergo this energy change isothermally, or nearly isothermally, very narrow temperature ranges can be maintained.

The term "alkane" refers to a saturated hydrocarbon having the formula $C_nH_{2n+2}$ and having a melting point in the range of about −30° C. to about 40° C. In one embodiment, the alkane has a latent heat in the range of about 150 kJ/kg to about 280 kJ/kg. In another embodiment, the alkane has a latent heat in the range of about 175 kJ/kg to about 280 kJ/kg. In another embodiment, the alkane has a latent heat in the range of about 200 kJ/kg to about 280 kJ/kg. In another embodiment, the alkane has a nearly isothermal melting transition. When an alkyl residue having a specific number of carbons is named, all geometric isomers having that number of carbon atoms are intended to be encompassed; thus, for example, when decane is named, it includes, inter alfa, n-decane, 2-methylnonane, 3-methylnonane, 4-methylnonane, 5-methylnonane, 3-ethyloctane, 4-ethyloctane, 2,2-dimethyloctane, etc.

The term "alkene" refers to an unsaturated hydrocarbon having the formula $C_nH_{2n}$ and having a melting point in the range of about −40° C. to about 40° C. In one embodiment, the alkane has a latent heat in the range of about 150 kJ/kg to about 280 kJ/kg. In another embodiment, the alkane has a latent heat in the range of about 175 kJ/kg to about 280 kJ/kg. In another embodiment, the alkane has a latent heat in the range of about 200 kJ/kg to about 280 kJ/kg. In another embodiment, the alkane has a nearly isothermal melting transition. Examples of alkanes include dodecene, tridecene, tetradecene, pentadecane, hexadecene, heptadecene, octadecene, nonadecene, eicosene, and docosene. In one embodiment, the alkene is selected from 1-dodecene, 1-tetradecene, 1-hexadecene, 1-octadecene, 1-icosene, 1-docosene. In another embodiment, the alkene is 1-octadecene or 1-icosene.

The term "hydrated salt(s)" refers to water mixed with a single salt or combination of salts.

The term "fatty acid" refers to an alkane or alkene with a carboxylic acid group and having a melting point in the range of about −5° C. to about 40° C. When an alkyl or alkenyl residue having a specific number of carbons is named, all geometric isomers having that number of carbon atoms are intended to be encompassed. Examples of fatty acids include acetic acid, propionic acid, butyric acid, pentanoic acid, hexanoic acid, heptanoic acid, octanoic acid, nonanoic acid, decanoic acid, undecanoic acid and dodecanoic acid.

The term "fatty esters" refers to a fatty acid in which the carboxylic acid group is replaced with an ester and having a melting point in the range of about −40° C. to about 80° C. Examples of fatty esters include methyl, ethyl, propyl, and butyl esters of decanoic acid, undecanoic acid, dodecanoic acid, trideconic acid, tetradecanoic acid, pentanoic acid, hexanoic acid, heptanoic acid, and octanoic acid.

The term "eutectic mixture" refers to the lowest melting composition of a mixture of two components. Examples of eutectics include about a 1:2 of choline chloride to urea, acetamide, thiourea, trichloroacetic acid, phenlyacetic acid, malonic acid, oxalic acid, p-toluene sulfonic acid, m-cresol, phenol, ethylene glycol, glycerol, or D-(-)-fructose. In one embodiment, the eutectics mixture is about a 1:2 ratio of choline chloride to p-toluenesulfonic acid or about 1:2 ratio of choline chloride to oxalic acid.

The term "open cell foam" is a type of foam in which greater than about 50% of the cells are open and/or interconnected by pores on the cell walls. Pore size can range in size from 1 nm to 100 um. Examples of open cell foams include floral foam, pressed silica, polyurethane-based foams, EVA foams, polyesters, epoxide foams, vinyl-based foams, wood (e.g. balsa) and cellulosic foams.

The term "bottle" is used interchangeably with the term "vessel assembly".

4.2 Vessel Assemblies

The present disclosure provides a vessel assembly for use in temperature sensitive shipping that can maintain a payload temperature across a range of temperatures (e.g., from about 15° C. to about 25° C.). The vessel assembly comprises two or more immiscible PCMs in contact with each other. By using two or more immiscible PCMs in a single vessel assembly, the overall packaging materials used in a shipper box is reduced. Advantageously, the single vessel assembly comprising two or more PCMs prevents the "wrong" mixture of PCM-containing vessels from being used.

In one aspect, the present disclosure provides a vessel assembly comprising a vessel having a chamber and optionally a filling port. The chamber comprises a first PCM that operates at an upper limit in a range of temperatures and a second phase change material that operates at a lower limit in the range of temperatures. The second phase change material is in contact with but immiscible with the first phase change material.

The vessel used in the vessel assembly of the present disclosure is constructed from materials that are impermeable to the particular PCMs being used. Suitable materials for the vessel include, but are not limited to, Nylon-LLDPE laminated plastic film, fluorine-treated blow-molded HDPE, polyethylene, polypropylene, EVOH, nylon, fluorinated PE, fluorinated PP, PTFE, a fluorinated polymer, coextruded PE/Nylon, PP/Nylon, PE/EVOH and PP/EVOH.

The first and second PCMs are selected based on their melting points and latent heat. When the desired temperature range is from about 15° C. to about 25° C., the first PCM operates at the upper limit in the range and the second PCM operates at the lower limit. When the first and second PCMs are used together in an insulated shipping box, they can buffer the internal temperature against high or low external temperatures.

In addition, the first and second PCMs are immiscible and unreactive with each other. For example, the first PCM can be a polar molecule and the second PCM can be a non-polar molecule.

At the temperatures being used, each PCM must also chemically stable and not decompose. The PCMs have largely different densities from each other. When the two PCMs are placed in the same container, they remain as separate phases. For example, the first PCM remains separate from the second PCM regardless of whether the PCM is in the liquid or solid state and at across the desired range of temperatures.

The two PCMs will naturally separate and form two regions or phases within the same vessel assembly. No mixing is required. If the vessel assembly is shaken, the two phases will quickly settle out separately from each other. The two PCM are not forced to mix though the addition of emulsifiers, surfactants, or other additives. In fact, emulsification is not preferred as it disrupts both PCMs' individual thermal properties and the resulting mixture has undesirable thermal properties. The mixture of two PCMs is not a slurry comprised of micro-encapsulated PCM, PCM capsules, or other method keeping the materials physically separated. Furthermore, it is not a composite structure where the PCMs are encased in an inert structural matrix (like wallboard).

The chamber of the vessel assembly comprises a first PCM that operates at an upper limit in a range of temperatures. The first PCM is a hydrated salt and includes sodium chloride, magnesium nitrate, sodium nitrate, ammonium chloride, calcium bromide, calcium chloride, ammonium nitrate, sodium sulfate, potassium carbonate, potassium chloride, and others. In one embodiment, the first PCM is calcium chloride hexahydrate. The chamber of the vessel assembly comprises a second PCM that operates at a lower limit in a range of temperatures. The second PCM is an alkane and includes decane, undecane, dodecane, tridecane, tetradecane, pentadecane, hexadecane, heptadecane, octadecane, nonadecane, icosane and mixtures thereof. In one embodiment, the alkane is selected from tetradecane, hexadecane, heptadecane, octadecane and nonadecane. In another embodiment, the alkane is selected from tetradecane, hexadecane, heptadecane, and octadecane. In another embodiment, the alkane is selected from tetradecane, hexadecane, heptadecane, and nonadecane. In another embodiment, the alkane is selected from tetradecane, heptadecane, octadecane and nonadecane. In another embodiment, the alkane is hexadecane. In another embodiment, the alkane is tetradecane.

In one embodiment, one PCM is selected from Microtek 24B5 (custom blend, an alkane mixture), PLUSS OM21 (blend of various organic fatty acids), PLUSS HS22 (mixture of inorganic salts), RGEES HS22P (mixture of hydrated salts), Rubitherm RT21 (data sheet is found on the world wide web at rubitherm.eu/media/products/datasheets/Techdata_-RT21_EN_06082018.PDF), Rubitherm RT21HC (data sheet is found on the world wide web at rubitherm.eu/media/products/datasheets/Techdata_-RT21HC_EN_06082018.PDF), Rubitherm RT22HC (data sheet is found on the world wide web at rubitherm.eu/media/ products/datasheets/Techdata_-RT22HC_EN_06082018.PDF), Climator ClimSel C21 (a hydrated salt containing sodium chloride, water and additives), Climator ClimSel C24 (a hydrated salt containing sodium sulphate, water and additives), Cryopak Phase 22 (eutectic mixture), CrodaTherm 21(water insoluble organic PCM derived from plant-based feedstocks with product information available on the world wide web at crodatherm.com/en-gb/technical-library/datasheets-and-msds), CrodaTherm 24 (water insoluble organic PCM derived from plant-based feedstocks with product information available on the world wide web at crodatherm.com/en-gb/products-and-applications/product-finder/product/1364/Croda-Therm_1_24), CrodaTherm 24W (water insoluble organic PCM derived from plant-based feedstocks with product information available on the world wide web at crodatherm.com/en-gb/products-and-applications/product-finder/product/1365/CrodaTherm_1_24W), Roper 23 A (custom blend, alkane mixture), Roper 23 B (custom blend, alkane mixture), Roper 23 C (custom blend, alkane mixture); and the other PCM is selected from the group consisting of Microtek 19.7B5 (custom blend, alkane mixture), Sasol Parafol 16-97 (a high purity mixture of saturated alkanes in the $C_{14}$-$C_{16}$ carbon range), Sasol PARAFOL 17-97 (heptadecane), Sasol LINPAR 17 (heptadecane).

It should be understood that the selection of a particular combination of PCMs will depend on a variety of factors, including the desired thermal characteristics, immiscibility, chemical stability, safety, suitability for use in shipping boxes, availability, and cost of the PCMs.

The mass ratio of the PCMs used will vary depending on the season of shipping, the size and configuration of the shipping box, the targeted thermal profile(s) and shipping lanes. In some embodiments, the mass ratio of the PCMs provides optimal performance in both hot and cold season shipping. In some embodiments, the mass ratio of the first PCM to the second PCM is from about 5:1, from about 4:1, from about 3:1, from about 2:1, and from about 1:1. In one embodiment, the mass ratio of the first PCM to the second PCM is from about 5:1. In one embodiment, the mass ratio of the first PCM to the second PCM is from about 4:1. In one embodiment, the mass ratio of the first PCM to the second PCM is from about 3:1. In one embodiment, the mass ratio of the first PCM to the second PCM is from about 2:1. In one embodiment, the mass ratio of the first PCM to the second PCM is from about 1:1.

In one embodiment, the second PCM is hexadecane and is predominantly n-hexadecane (>97%) with other n-alkane and branched alkane impurities. The first PCM is predominately calcium chloride hexahydrate and water but may contain other inorganic hydrated salts and other additives. The ratio is approximately 48% weight percent of calcium chloride to water. The vessel assembly contains 450g of hexadecane and 905g of the calcium chloride hexahydrate solution.

Referring now to FIG. 1, one aspect of the disclosure provides a vessel assembly 1 comprising a vessel 2 having a chamber and a filling port 3. The chamber of the vessel is filled with a first PCM 4, and a second PCM 5. After the chamber is filled with the PCMs, the filling port 3 is sealed. The filling port 3 can be permanently sealed, e.g., using a heat sealer, or temporarily sealed with a cap.

In embodiments in which the vessel assembly is made from a flexible material, it may be desirable to mix the PCM with an open-cell material to stabilize the form of the vessel.

While the vessel assembly 1 is depicted in FIG. 1 as a rectangle, it should be understood that any shape can be used and tailored to the size and shape of the payload. For example, the vessel assembly can have a rectangular profile on one face and a semi-cylindrical profile on the opposite face. Such a shape can be used for cylindrical payloads. In addition, the opposite face can be semi-cylindrical, rectangular with other dimensions, or any shape that provides a volume-efficient fit to the payload.

In some embodiments, the vessel assembly comprises a temperature indicator. The temperature indicator may be a mechanical device, such as a bimetallic disk, strip, or coiled spring, etc. that reacts to temperature and provides a visual indication. The temperature indicator may be a chemical device, such as a phase change, leuco dye, thermochromic material, liquid crystal, etc. that reacts to temperature and provides a visual indicator through change in color or opacity.

In another embodiment, the vessel assembly further comprises electronics. The electronics can be integrated into or onto the vessel. Examples of useful electronics include RFID, temperature sensors, humidity sensors, accelerometers, GPS and the like.

4.3 Methods of Preparing Vessel Assemblies

The present disclosure provides a method of preparing a vessel assembly for maintaining a payload temperature across a range of temperatures. The method comprises filling a chamber of a vessel with a first PCM; and filling the chamber vessel with a second PCM. The first PCM operates at an upper limit in a range of temperatures and the second PCM operates at a lower limit in the range of temperatures. The second phase change material is in contact with but immiscible with the first phase change material.

The two PCMs are each filled into the vessel assembly by any method known in the art. For example, the two PCMs can be poured or pumped into the vessel assembly sequentially, with no preference on which PCM is filled first. Alternatively, the vessel assembly can be filled using a volumetric metering system such as a two-piston pump or a set of metering pumps and then through a common nozzle. The amount of each PCM type is determined by selecting a ratio that optimizes the vessel assembly's ability to control the temperature in both a hot and cold environment.

4.4 Insulated Shipping Boxes

The present disclosure provides an insulated shipping box comprising a vessel assembly as described herein.

The insulated shipping box may further comprise at least one vacuum insulation panel. Vacuum insulation panels are well known in the art and comprise a core material contained within a sealed enclosure, from which air has been evacuated. The core material may be made from any open cell material, including but not limited to, polystyrene, polyurethane, fiberglass, silica and organic foam. Suitable core materials include, but are not limited to, AEROCORE (available from American Aerogel Corporation), NANOGEL (available from Nanopore), and those disclosed in U.S. Pat. Nos. 7,521,485, 6,344,240, 6,315,971, 6,090,439 and 5,877,100, the contents of which are incorporated by reference.

The insulated shipping box may further comprise a payload. The payload may be any temperature sensitive product. Examples of temperature sensitive products that may be used include, but are not limited to, food products, specialty chemicals, pharmaceutical and life science products, biomedical products, test specimens, blood, organ, tissues and electronics.

The shipping box may be any size or shape, depending on the size and shape of the payload and the number of payloads. The container may be paper, pressboard, composition board, cardboard, wood, metal, plastic or any other suitable material.

Referring to FIG. 1, the insulated shipper bos 6 comprises an outer paperboard bos 7, vacuum insulation panel assembly 8, the vacuum insulated panel lid 9, vessel assembly 10 and payload box 11. The payload box 11 comprises a temperature-sensitive payload. While FIG. 1 shows an insulated shipper box containing three vessel assemblies, it is to be understood that the number, and nature, of the vessel assemblies can be varied depending on the desired temperature control. For example, a shipper box can contain four vessel assemblies each of which has the same set of PCMs or four vessel assemblies, at least one different set of PCMs. Similarly, the shipper box can contain one vessel assembly or more.

4.5 Methods of Use

The present disclosure also provides methods of transporting a payload to a desired location. This method comprises placing a vessel assembly within a shipper box; placing a payload within the shipper box; and transporting the shipper box comprising the payload to the desired location. The vessel assembly may be any of the vessel assemblies described herein.

The present disclosure also provides methods of insulating a payload. The method comprises providing a vessel assembly within a shipper box; and placing a payload within the shipper box. The vessel assembly insulates the payload.

The present disclosure further provides methods of maintaining a payload temperature within a range. The method comprises providing a vessel assembly within a shipper box; and placing a payload within the shipper box. The vessel assembly maintains the payload temperature within the range.

In the methods of the present disclosure, prior to use, the PCM vessel assemblies are pre-conditioned at a temperature of 20° C. for a period of time which puts the calcium chloride hexahydrate in a solid state and hexadecane in a liquid state. Then the PCM vessel assemblies are placed inside the insulated shipping box adjacent to the temperature-sensitive payload. During shipping, when the insulated shipping box encounters hot external temperatures, the first PCM (e.g., calcium chloride hexahydrate) melts. Conversely, in cold external environments, the second PCM (e.g., hexadecane) freezes. This change of phase of the PCM adsorbs (or releases) energy that would normally raise (or lower) the internal temperature and helps maintain the desired internal temperature for a longer time.

In order that this invention be more fully understood, the following examples are set forth. These examples are for the purpose of illustration only and are not to be construed as limiting the scope of the invention in any way.

5. EXAMPLES

The following examples are presented for illustrative purposes and should not serve to limit the scope of the disclosed subject matter.

Source of Materials

Hexadecane was sourced from Sasol (Parafol 16-97). Calcium chloride hexahydrate solution was sourced from PLUSS (PCM HS22P). The insulated shipping box was an AeroSafe Global A50 8L2 shipper with 1-inch thick Vacuum Insulated Panels. It has outside dimensions of 14.63×10.13×11.13 inches.

PCM Bottle

The PCM bottle is a blow-molded HDPE bottle with dimensions of 5.9×11.5×1.5 inches and having a capacity of 1.2 L. The hexadecane and calcium chloride hexahydrate solution were measured out to achieve the desired ratio as indicated in Table 1 and placed into the bottle. The filling port was permanently closed with an HDPE cap sealed by spin welding or ultrasonic welding.

Instruments Used

Environmental chambers, Omega T-type thermocouples, National Instruments NI-9213 data acquisition module.

Example 1

Preparation of Materials

The hexadecane and calcium chloride hexahydrate solution were measured out to achieve the desired ratio as indicated in Table 1 and divided into 10 HDPE blow-molded bottles. In this way, a set of identical, filled containers were produced, each having the same ratio of the two PCMs inside. Half of these containers were set aside (these samples are referred to as "non-cycled" in Table 2 below). The remaining 5 containers were placed in an environmental chamber that cycled between −20 and 45° C., being held for 90 minutes at each temperature, in order to cause melting and freezing of both PCMs within. This was repeated for 100 freeze/melt cycles (these samples are referred to as "cycled" in Table 2 below). Also, control samples of each unmixed PCM were prepared and set aside for use in Example 3.

TABLE 1

| PCM | Mass Ratio | Mass Each (g) | Total Mass (g) | Liquid Density (kg/L) | Volume Each (mL) | Total Vol (mL) |
|---|---|---|---|---|---|---|
| Calcium Chloride Hexahydrate | 67% | 905 | 1355 | 1.54 | 588 | 1172 |
| Hexadecane | 33% | 450 | | 0.77 | 584 | |

Example 2

Insulated Shipper Duration Test

Prior to use, each PCM bottle was preconditioned at a temperature of 20° C. for 48 hours to ensure that the hexadecane was in a liquid state and the calcium chloride hexahydrate solution was in a solid state. After preconditioning, three "cycled" PCM bottles were placed inside one insulated shipping box and three "non-cycled" PCM bottles were placed inside a second insulated shipping box. A vial of 20 mL water attached to a thermocouple was placed within each insulated shipping box. The insulated shipping box was then closed.

The two boxes were placed in an environmental chamber where a temperature vs. time profile was run to simulate external temperatures seen in real-world shipping. The ISTA 7D 72hr Summer and Winter Profiles were used. A-B tests were done for both summer and winter profiles, with all tests repeated with the PCM bottles from the first box placed into the second and those from the second box placed into the first box. Exchanging the PCM bottles verified that the insulating value of the box was not a factor.

Results

Duration was determined by measuring the time required for the internal temperature of the water in the vial to increase or decrease outside the 15 to 30° C. range. Table 2 below provides the results of the duration test.

TABLE 2

| Test | Profile | Box Used | PCM Plates | Duration (hr) | Difference |
|------|---------|----------|------------|---------------|------------|
| 191223 | Summer | 8L2-1517 | Cycled | 144.8 | 1.2% |
|  |  | 8L2-1519 | Not Cycled | 146.5 |  |
| 200108 |  | 8L2-1519 | Cycled | 138.9 | −0.9% |
|  |  | 8L2-1517 | Not Cycled | 137.6 |  |
| 200102 | Winter | 8L2-1517 | Cycled | 88.9 | 0.4% |
|  |  | 8L2-1519 | Not Cycled | 89.3 |  |
| 200116 |  | 8L2-1519 | Cycled | 92.4 | 3.4% |
|  |  | 8L2-1517 | Not Cycled | 95.7 |  |

As shown in Table 2, in all four sets of tests, the difference in duration between the cycled and not cycled PCM plates was less than ±3.5% (summer tests: 144.8/146.5 and 138.9/137.6 hours; winter tests: 88.9/89.3 and 92.4/95.7 hours). This difference is less than the typical experimental error for this type of test, so the performance of the cycled and non-cycled were deemed to be equivalent.

Conclusion

These results showed that placing the two immiscible PCMs in a common vessel did not adversely affect their thermal properties and their ability to buffer temperature changes in an insulated shipping box.

Example 3

T-History

The T-history method was used to measure the latent heat, melting point, and freezing point of the PCMs. Samples of each type of PCM were taken out of a bottle containing the combined PCMs, as well as new (never-mixed) samples. Both melting and freezing tests were done on each sample to obtain the latent heat and specific heat of each PCM material over the range of 15 to 25° C.

Results

Table 3 and Table 4 provides the latent heat results of the T-History experiments (melting point and freezing point results not shown).

TABLE 3

Hexadecane

| Test | PCM Sample | Latent Heat (kJ/kg K) | Difference |
|------|------------|----------------------|------------|
| Freeze | New | 247 | −2.1% |
|  | From Mixed | 242 |  |

TABLE 3-continued

Hexadecane

| Test | PCM Sample | Latent Heat (kJ/kg K) | Difference |
|------|------------|----------------------|------------|
| Melt | New | 258 | −0.4% |
|  | From Mixed | 257 |  |

TABLE 4

Calcium chloride hexahydrate solution

| Test | PCM Sample | Latent Heat (kJ/kg K) | Difference |
|------|------------|----------------------|------------|
| Freeze | New | 158 | −6.0% |
|  | From Mixed | 149 |  |
| Melt | New | 114 | 1.7% |
|  | From Mixed | 116 |  |

Figure 3:
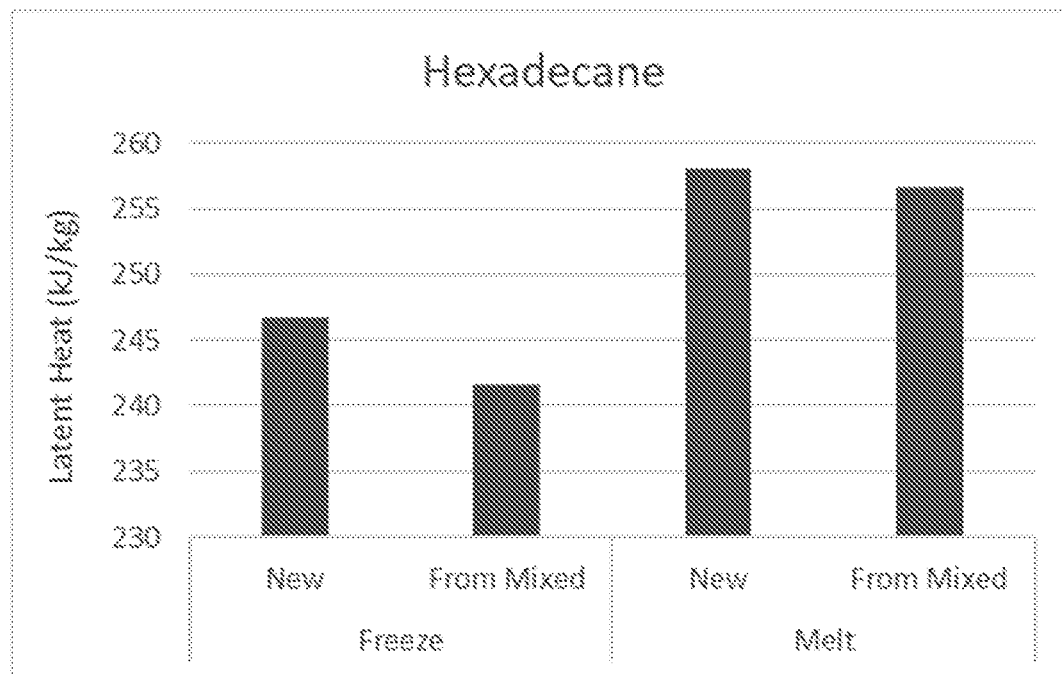
FIG. 3 shows measures of latent heat for samples of hexadecane at its freezing point and melting point (see Example 3).
Figure 4:
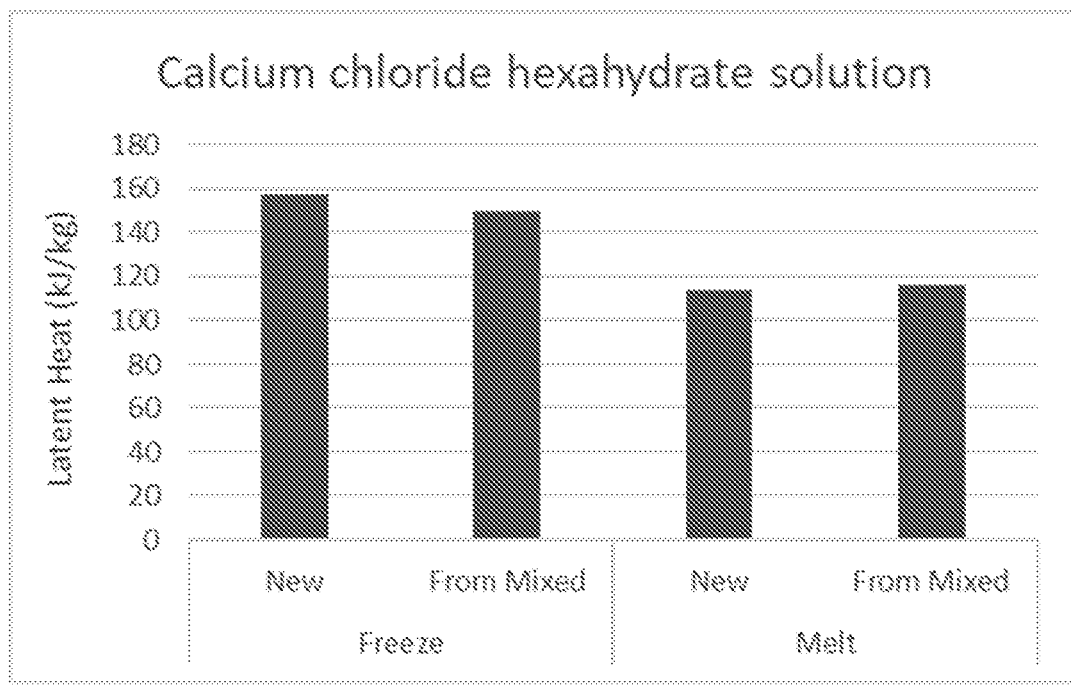
FIG. 4 shows measures of latent heat for samples of calcium chloride hexahydrate solution at its freezing point and melting point (see Example 3).

As shown in Tables 3 and 4 and in FIGS. 3 and 4, some change in the measured latent heat was observed, but the differences between the samples from the mixed vs. the new materials were small and within the range of error for the equipment used.

Conclusion

These results showed that placing the two immiscible PCMs in a common vessel did not adversely affect their thermal properties and their ability to buffer temperature changes in an insulated shipping box.

While the invention has been disclosed in some detail by way of illustration and example for purposes of clarity of understanding, it is apparent to those in the art that various changes may be made and equivalents may be substituted without departing from the true spirit and scope of the invention. Therefore, the description and examples should not be construed as limiting the scope of the invention.

What is claimed is:

1. A vessel assembly comprising a vessel having a molded outer wall forming an internal chamber for containing phase change materials,
the internal chamber comprising a first phase change material that operates at an upper limit in a range of temperatures and a second phase change material that operates at a lower limit in the range of temperatures, the second phase change material being in contact with, but immiscible with, the first phase change material, wherein the vessel assembly is shaped to fit a payload to create a volume-efficient fit for the payload.

2. The vessel assembly of claim 1, wherein the first phase change material is a hydrated salt(s).

3. The vessel assembly of claim 2, wherein the hydrated salt is selected from the group consisting of sodium chloride, calcium chloride, sodium sulfate, ammonium nitrate, potassium carbonate, ammonium chloride, and potassium chloride.

4. The vessel assembly of claim 3, wherein first phase change material is calcium chloride.

5. The vessel assembly of claim 1, wherein the second phase change material is an alkane.

6. The vessel assembly of claim 5, wherein the second phase change material is hexadecane.

7. The vessel assembly of claim 1, wherein the outer wall of the vessel comprises a material selected from Nylon-LLDPE laminated plastic film, fluorine-treated blow-molded HDPE, polyethylene, polypropylene, EVOH, nylon, fluorinated PE, fluorinated PP, PTFE, a fluorinated polymer, coextruded PE/Nylon, PP/Nylon, PE/EVOH and PP/EVOH.

8. The vessel assembly of claim 1, further comprising a temperature indicator.

9. The vessel assembly of claim 1, further comprising electronics.

10. A method of preparing a vessel assembly for maintaining a payload temperature across a range of temperatures, the vessel assembly comprising a vessel having a molded outer wall forming an internal chamber for containing phase change materials and being shaped to fit a payload to create a volume-efficient fit for the payload, the method comprising
   a. filling the internal chamber of the vessel with a first phase change material that operates at an upper limit in a range of temperatures; and
   b. filling the internal chamber with a second phase change material that operates at a lower limit in the range of temperatures, the second phase change material being in contact with, but immiscible with, the first phase change material.

11. An insulated shipping box, comprising a vessel assembly, the vessel assembly comprising a vessel having a molded outer wall forming an internal chamber for containing phase change materials, the internal chamber comprising a first phase change material that operates at an upper limit in a range of temperatures and a second phase change material that operates at a lower limit in the range of temperatures, the second phase change material being in contact with, but immiscible with, the first phase change material, wherein the vessel assembly is shaped to fit a payload to create a volume-efficient fit for the payload.

12. The insulated shipping box of claim 11, further comprising at least one vacuum insulation panel.

13. The insulated shipping box of claim 12, wherein the vacuum insulation panel comprises a core material selected from the group consisting of polystyrene, polyurethane, fiberglass, silica and organic foam.

14. The insulated shipping box of claim 11, further comprising a payload.

15. A method of transporting a payload to a desired location, the method comprising
   a. placing a vessel assembly according to claim 1 and preconditioned to a specific temperature within a shipper box;
   b. placing a payload within the shipper box; and
   c. transporting the shipper box comprising the payload to the desired location.

16. A method of insulating a payload, the method comprising
   a. providing a vessel assembly according to claim 1 and preconditioned to a specific temperature within a shipper box; and
   b. placing a payload within the shipper box.

17. A method of maintaining a payload temperature within a range, the method comprising
   a. providing a vessel assembly according to claim 1 and, preconditioned to a specific temperature, within a shipper box; and
   b. placing a payload within the shipper box;
   wherein the vessel assembly maintains the payload temperature within the range.

18. The vessel assembly of claim 1, wherein the vessel comprises a filling port.

* * * * *